(12) United States Patent
Bea

(10) Patent No.: US 10,090,732 B2
(45) Date of Patent: Oct. 2, 2018

(54) CONNECTING STRUCTURE FOR MECHANICAL CONNECTION OF A FIRST HOUSING WITH A SECOND HOUSING

(75) Inventor: Dominik Bea, Villingen-Schwenningen (DE)

(73) Assignee: IMS GEAR SE & CO. KGAA, Donaueschingen (DE)

(*) Notice: Subject to any disclaimer, the term of this patent is extended or adjusted under 35 U.S.C. 154(b) by 374 days.

(21) Appl. No.: 13/823,203

(22) PCT Filed: Sep. 30, 2011

(86) PCT No.: PCT/EP2011/004889
§ 371 (c)(1),
(2), (4) Date: Jul. 9, 2013

(87) PCT Pub. No.: WO2012/041511
PCT Pub. Date: Apr. 5, 2012

(65) Prior Publication Data
US 2013/0319152 A1 Dec. 5, 2013

(30) Foreign Application Priority Data
Sep. 30, 2010 (DE) .......... 10 2010 047 008

(51) Int. Cl.
*H02K 7/116* (2006.01)
*B25F 5/02* (2006.01)
*H02K 5/04* (2006.01)

(52) U.S. Cl.
CPC ........... *H02K 7/116* (2013.01); *B25F 5/02* (2013.01); *H02K 5/04* (2013.01); *Y10T 74/19684* (2015.01)

(58) Field of Classification Search
None
See application file for complete search history.

(56) References Cited

U.S. PATENT DOCUMENTS 2,687,789 A * 8/1954 Nardone .......... 477/13
8,137,229 B2 * 3/2012 Kempf et al. .......... 475/149
(Continued)

FOREIGN PATENT DOCUMENTS

| CN | 101213726 A | 7/2008 |
| CN | 201325030 Y | 1/2009 |
| DE | 66 01 054 U | 1/1965 |

(Continued)

OTHER PUBLICATIONS

Office Action from corresponding Chinese Patent Office, dated Jan. 14, 2015. English translation attached.
(Continued)

*Primary Examiner* — Ramya P Burgess
*Assistant Examiner* — Timothy Hannon
(74) *Attorney, Agent, or Firm* — William Gray Mitchell

(57) ABSTRACT

The invention relates to a connecting structure for mechanical connection of a first housing with a second housing, whereby one face of the second housing has a hollow cylindrical recess for inserting the first housing; according to the invention it is provided that (i) the hollow cylindrical recess is formed of a ring-shaped collar, and (ii) for producing a frictional connection of the first housing with a second housing, the collar has at least one tensioning element, which in radial direction with respect to the collar is in active connection with the first housing.

4 Claims, 2 Drawing Sheets

(56) References Cited

U.S. PATENT DOCUMENTS

2006/0163481 A1\* 7/2006 Huang .......................... 250/330
2008/0197733 A1\* 8/2008 Oberle et al. ................... 310/89

FOREIGN PATENT DOCUMENTS

| DE | 88 05 632 U1 | 4/1988 |
| DE | 90 03 771 U1 | 3/1990 |
| DE | 42 42 701 A1 | 12/1992 |
| DE | 695 30 892 T2 | 7/1995 |
| DE | 203 04 904 U1 | 3/2003 |
| GB | 677 903 A | 6/1949 |

OTHER PUBLICATIONS

Office Action issued by the GPTO dated Nov. 6, 2015 for related German patent application 10 2010 047 008.2.
Office Action issued by the KIPO dated Aug. 23, 2016 for related German patent application 10 2013 7007373, dated Feb. 16, 2017.

\* cited by examiner

CONNECTING STRUCTURE FOR MECHANICAL CONNECTION OF A FIRST HOUSING WITH A SECOND HOUSING

CROSS REFERENCE TO RELATED APPLICATIONS

This patent application claims priority to International Patent Application PCT/EP2011/004889, filed on Sep. 30, 2011, and thereby to German Patent Application 10 2010 047 008.2, filed on Sep. 30, 2010.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

The invention relates to a connecting structure for manual connection of a first housing with a second housing.

Such a connecting structure of a motor housing for an electric motor and a transmission housing is known from DE 203 04 904 U1. The motor housing is shaped as a metal casing that is inserted into a hollow cylindrical recess designed in the face side of the transmission housing. The open face side of the metal casing holding the electric motor is closed by a flange so the metal casing can be tensioned between this flange and the transmission housing by way of a collar arranged on the edge side using screws. In order to achieve the required sealing of the motor interior chamber, in this known connecting structure captive gaskets are molded on the housing parts.

This known motor-transmission unit has the disadvantage that the associated connecting structure can only be used on pot-shaped motor housings that are thus specifically designed. Moreover, for implementation of the formed gaskets the housing parts are complicated and can only be manufactured with high costs. Finally, the assembly of such a motor-transmission unit according to DE 203 04 904 U1 is complicated, whereby the manufacturing costs increase further. Therefore this known concept according to DE 203 04 904 U1 lacks flexibility with regard to the motor housing that can be used, especially large-series motors with closed housing, which for price reasons are often manufactured without threaded hole, so a screw fastening on motor flanges is not possible.

Background of the Invention

The current state of knowledge is as follows.

Thus the object of the invention is to provide an improved connecting structure of the type named as the beginning, with which without a high degree of design effort two houses, especially a motor housing and a transmission housing can be connected to each other.

This object is achieved by a connecting structure with the characteristics disclosed herein.

BRIEF SUMMARY OF THE INVENTION

In a preferred embodiment, A connecting structure for mechanical connection of a first housing with a second housing, whereby one face of the second housing has a hollow cylindrical recess for inserting the first housing, characterized in that (i) the hollow cylindrical recess is formed of a ring-shaped collar, and (ii) for producing a frictional connection of the first housing with a second housing, the collar has at least one tensioning element, which in radial direction with respect to the collar is in active connection with the first housing.

In another preferred embodiment, the connecting structure as disclosed, wherein the tensioning element is designed as a threaded pin.

In another preferred embodiment, the connecting structure as disclosed, wherein the first housing further comprises a radially arranged engagement groove for the threaded pin in the area of the collar.

In another preferred embodiment, the connecting structure as disclosed, wherein the first housing further comprises a cylindrical flange, which is held by a pocket hole arranged on one face side of the second housing.

In another preferred embodiment, the connecting structure as disclosed, wherein the first housing is a motor housing and the second housing is a transmission housing.

In another preferred embodiment, the connecting structure as disclosed, further comprising wherein the transmission housing has a modular design, whereby one face side is designed with the ring-shaped color and the centering opening is designed as a motor flange.

In another preferred embodiment, the connecting structure as disclosed, wherein the motor flange further comprises a drive shaft mounted in a ball bearing, which is in active connection with an output shaft guided by the cylindrical flange of the motor housing.

In another preferred embodiment, the connecting structure as disclosed, wherein the transmission housing comprises a planetary gear set.

In another preferred embodiment, the connecting structure as disclosed, wherein the transmission housing comprises at least one gear stage with an annular ring, a sun gear and a planetary carrier holding the planetary gears, whereby the other face side of the transmission housing is formed as an output flange.

DETAILED DESCRIPTION OF THE INVENTION

Figure 1:
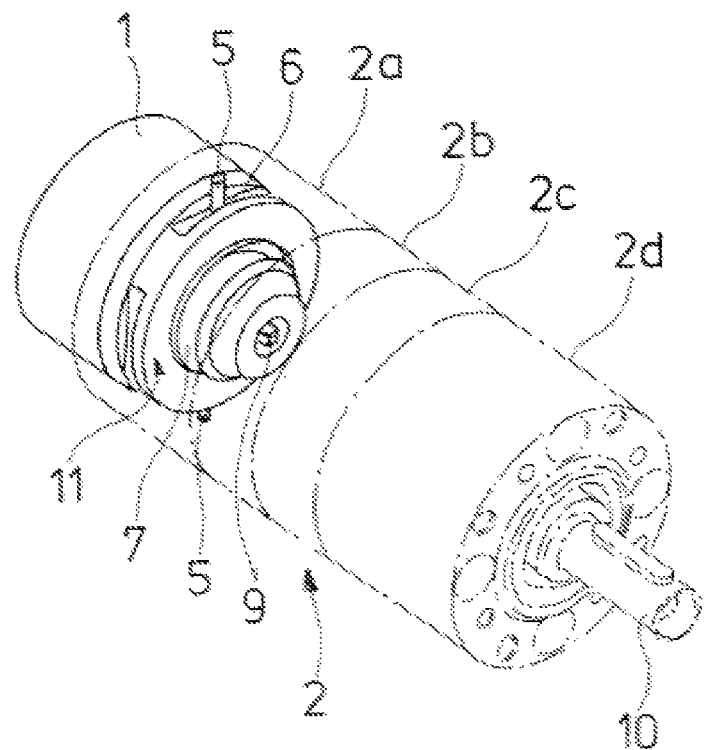
FIG. 1 is a line drawing evidencing a perspective view of a motor-transmission unit (partially as a phantom drawing) with a connecting structure as an embodiment of the invention.

The invention is a connecting structure for mechanical connection of a first housing with a second housing, in which one face side of the second housing has a hollow cylindrical recess for inserting the first housing, is characterized according to the invention in that the hollow cylindrical recess is formed by a ring-shaped collar, and for forming a frictional connection of the first housing with the second housing, the collar has at least one tensioning element, which in radial direction with respect to the collar is in active connection with the first housing.

Because of this, it is possible to connect a cylindrical housing, especially a motor housing with another housing, especially a transmission housing, in a simple manner whereby the assembly is especially significantly simplified since after inserting the first housing, e.g. of the motor housing, into the recess of the second housing formed as a ring-shaped collar, i.e. for example of the transmission housing, only the tensioning element is needed for radially and axially securing the connection of the two housings.

In one embodiment of the invention, the tensioning element is designed as a threaded pin that can be screwed into a threaded hole in a ring-shaped collar in a simple way and against the first housing, i.e. preferably the motor housing. In this case, it is advantageous if according to a further development of the invention, the first housing has a radially-arranged groove for the threaded pin in the area of the collar. Because of this, in addition to a better mutual fastening of the two housings, the assembly quality is also improved, and in particular a fault-free assembly is ensured.

According to another advantageous further development of the invention the first housing has, e.g. a motor housing, has a cylindrical flange that is the bearing for the output shaft, e.g. of an electric motor, whereby this flange is held by a pocket hole arranged on the face side of the second housing, especially a transmission housing. This improves the centering of the first housing with respect to the second housing, especially in the case of a motor housing; an exact alignment of the electric motor with respect to a transmission housing connected to it is simplified.

In a design of the invention according to the invention, the first housing designed as a transmission housing is constructed in a modular manner, whereby one face side with the ring-shaped collar and the center opening is designed as the motor flange. With such a motor flange, various transmission variants of a motor-transmission unit can be implemented with the connecting structure according to the invention.

According to another embodiment of the invention, an improved connection of a motor housing to a transmission housing is achieved in that the motor flange has a drive shaft in a ball bearing, which is in active connection with an output shaft driven by the cylindrical flange of the motor housing.

In an advantageous manner, the transmission housing comprises a planetary gear set, whereby preferably the transmission housing comprises at least one gear stage with an annular ring, a sun gear and a planet carrier holding the planetary gears, whereby the other face side of the transmission housing is formed of an output flange.

DETAILED DESCRIPTIONS OF THE FIGURES

Figure 2:
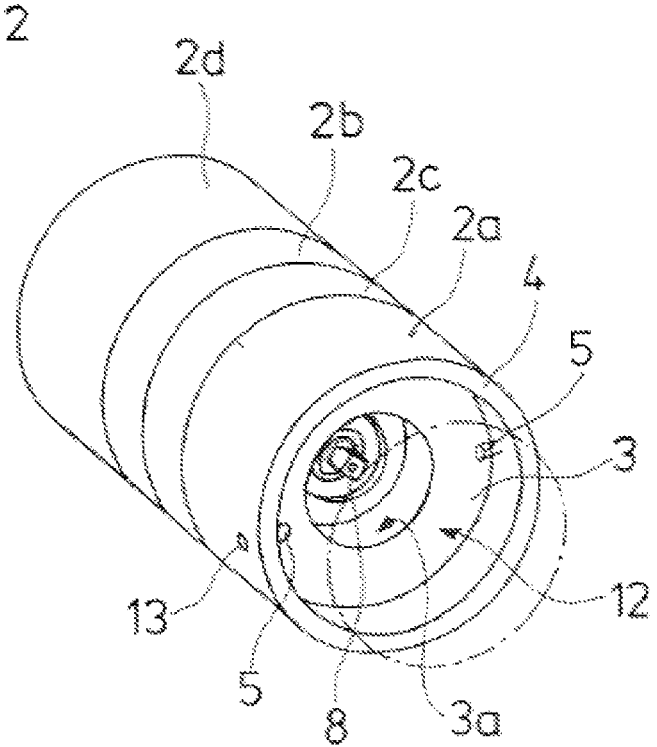
FIG. 2 is a line drawing evidencing a perspective view of the transmission housing according to FIG. 1.
Figure 3:
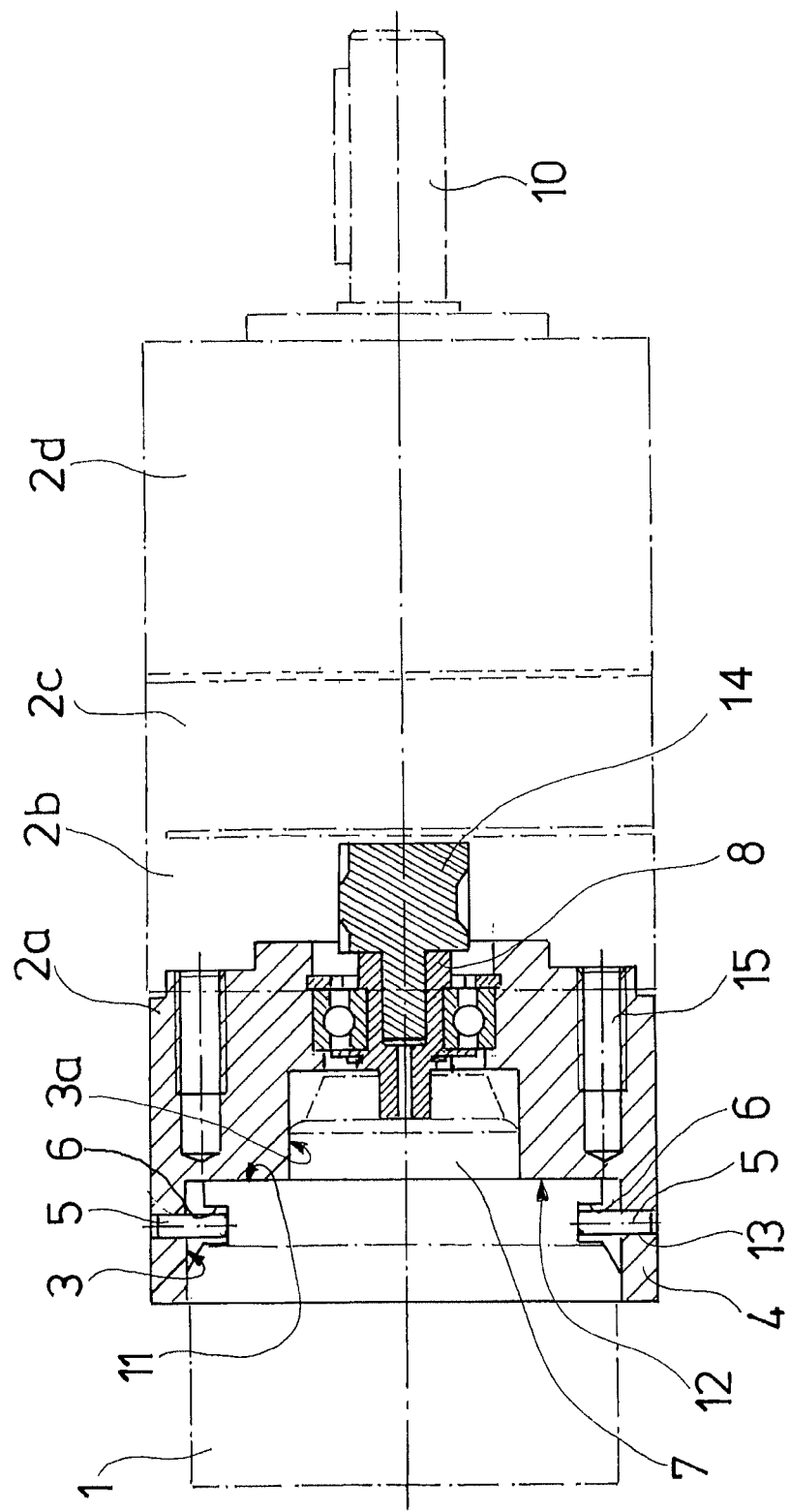
FIG. 3 is a line drawing evidencing an axial longitudinal cross section of the motor-transmission unit according to FIG. 1.

Referring now to the figures, The first housing, according to FIGS. 1 and 3 (e.g. a motor housing for holding an electric motor) is connected to a second housing, according to FIGS. 1, 2 and 3 designed as a modular transmission housing 2, according to the connection structure of the invention.

The motor housing 1 is designed with a cylindrical shape and on the output side has a bearing plate with a cylindrical flange 7, in which the output shaft 9 of the electric motor is mounted.

The transmission housing 2 holds a planetary gear and comprises a motor flange 2a with which the motor housing 1 is connected. In addition, the transmission housing has two gear stages 2b and 2c, each of which comprises an annular ring with sun gear, planetary gears and planetary carrier (not shown in the figures). The closure on the output side of the transmission housing 2 forms an output flange 2d with an output shaft 10.

For connecting the motor housing 1 with the transmission housing 2, the motor flange 2a is equipped with a hollow cylindrical recess 3, which is formed of a circular collar 4 on the drive side of the transmission housing 2. The inner diameter of the hollow cylindrical recess 3 formed by this collar 4 corresponds to the outer diameter of the motor housing 1 in the area of its bearing plate with the cylindrical flange 7. This hollow cylindrical recess 3 also has a central pocket hole 3a, the inner diameter of which corresponds to the outer diameter of the cylindrical flange 7 of the motor housing 1.

As the cross section representation according to FIG. 3 shows, the motor housing 1 is inserted with its cylindrical flange into the recess 3, whereby the flange 7 is held by the pocket hole 3a for centering the transmission housing 1. The face side 11 surface of the motor housing 1 lies flush on the recess base 12 of the recess 3.

For axial and radial fixing and securing of the transmission housing 2 on the motor housing 1, the transmission flange 2a has two radially-running threaded screws 5 as tensioning elements in the area of the collar 4, which are each screwed into a diametrically opposed threaded hole 13, until they each engage in an engagement groove 6 on the lateral surface of the motor housing 1 and because of this the transmission housing 2 is tensioned against the motor housing 1.

The motor flange 2a is equipped with a drive shaft 8 in a ball bearing, which is in active connection as a four-cornered shaft with the output shaft 9 of the motor housing 1, whereby this output shaft 9 has a hollow shaft profile with recessed square.

Naturally, the invention is not restricted to this active connection that is explained, rather any other suitable active connection can be provided between the output shaft 9 of the motor housing 1 and the drive shaft of the transmission housing 2, e.g. a usual motor-side output shaft with motor pinion pressed on.

According to FIG. 3, the drive shaft 8 of the motor flange 2a is connected to a sun gear 14 of the gear stage 2b mounted on the motor flange 2a by means of a threaded connection 15.

Finally, a tensioning element different from the threaded pins 5 shown in the exemplary embodiment can also be used; e.g. the use of a snap ring is also suitable.

LIST OF REFERENCE NUMBERS:

1 First housing, motor housing
2 Second housing, transmission housing
2a Motor flange of the transmission housing
2b Gear stage of transmission housing 2
2c Gear stage of transmission housing 2
2d Output flange of transmission housing 2
3 Hollow cylindrical recess in the second housing 2 and/or in the motor flange 2a

3a pocket hole in the recess 3
4 Ring-shaped collar
5 Tensioning element, threaded pin
6 Engagement groove on the first housing 1
7 Cylindrical flange of the first housing 1
8 Drive shaft of the motor flange 2a
9 Output shaft of the first housing 1
10 Output shaft of the transmission housing 2
11 Face side of the first housing 1
12 Recess base of recess 3
13 Threaded hole for tensioning element 5
14 Sun gear of the gear stage 2b
15 Threaded connection The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable Equivalents.

I claim:

1. A connecting structure for mechanical connection of a first housing with a second housing, wherein one face of the second housing has a hollow cylindrical recess for inserting the first housing, characterized in that (i) the hollow cylindrical recess is formed of a ring-shaped collar, (ii) the hollow cylindrical recess exists prior to insertion of the first housing; and (iii) for producing a frictional connection of the first housing with the second housing, the collar comprises at least one tensioning element, which in radial direction with respect to the collar is in active connection with the first housing, wherein the first housing is a motor housing and the second housing is designed as a modular transmission housing in the axial direction, wherein a face side surface of the motor housing lies flush on a recess base of the hollow cylindrical recess, and wherein the tensioning element is designed as a threaded pin, wherein the first housing further comprises a radially arranged engagement groove for the threaded pin in the area of the collar.

2. The connecting structure of claim 1, wherein the first housing further comprises a cylindrical flange, which is held by a pocket hole arranged on one face side of the second housing.

3. The connecting structure of claim 1, further comprising wherein the transmission housing has a modular design, wherein the one face side is designed with the ring-shaped collar and a centering opening is designed as a motor flange.

4. The connecting structure of claim 3, wherein the motor flange further comprises a drive shaft mounted in a ball bearing, which is in active connection with an output shaft guided by the cylindrical flange of the motor housing.

* * * * *